Nov. 16, 1965  G. H. SULLIVAN  3,217,706
IMPEDANCE OCULOGRAPH
Filed Oct. 2, 1962  3 Sheets-Sheet 1
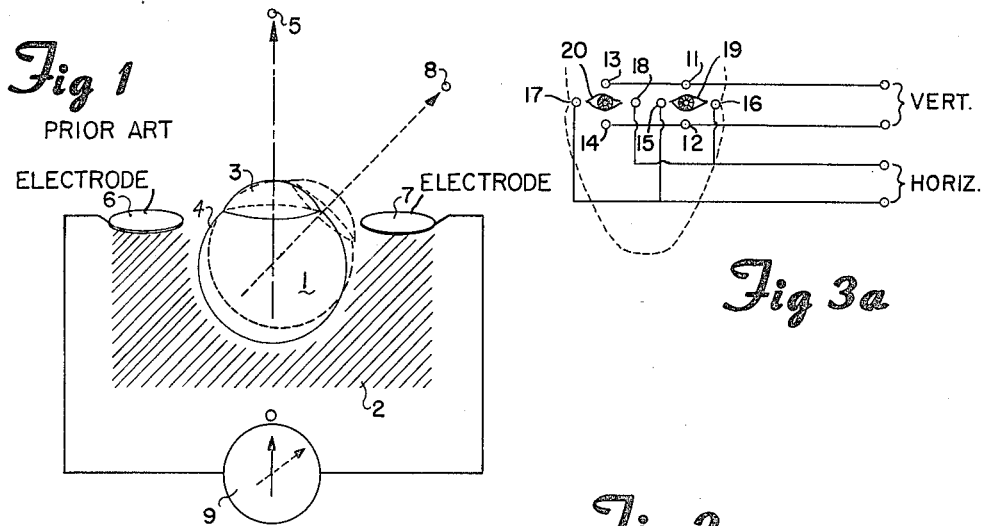
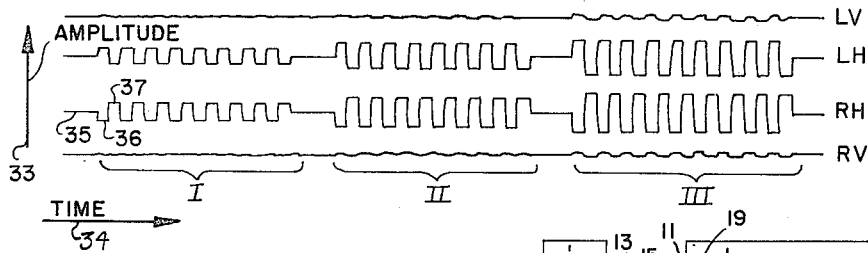
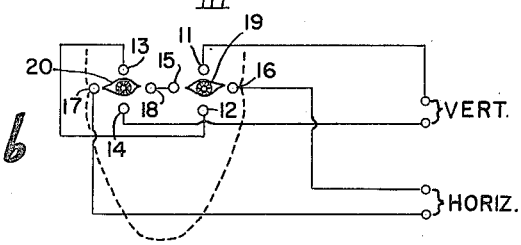
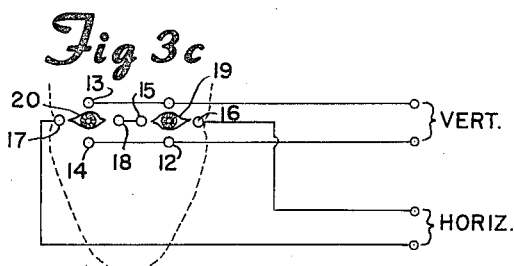
GEORGE H. SULLIVAN
*INVENTOR.*
BY R. E. Geangue
ATTORNEY

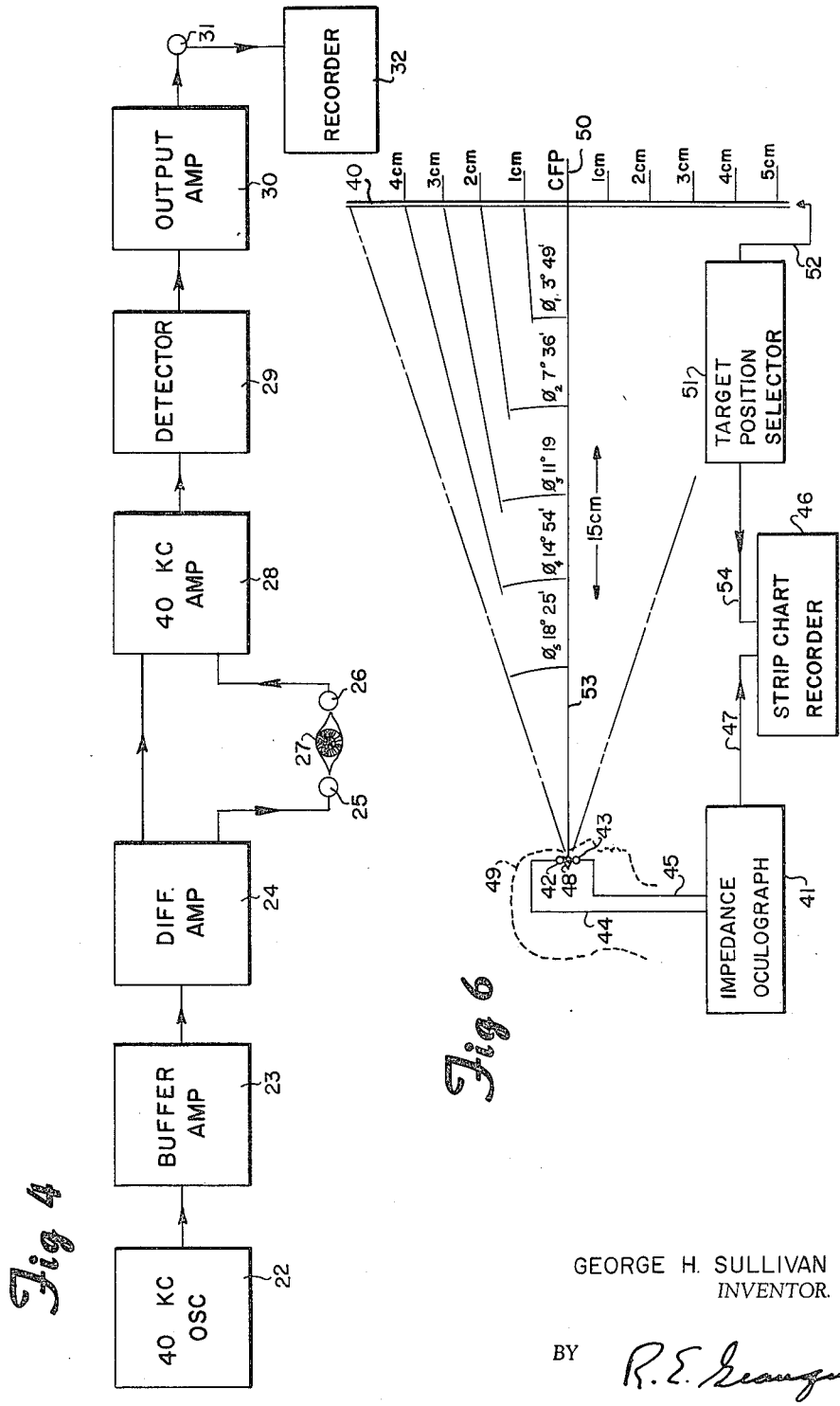

Nov. 16, 1965  G. H. SULLIVAN  3,217,706
IMPEDANCE OCULOGRAPH
Filed Oct. 2, 1962  3 Sheets-Sheet 3

GEORGE H. SULLIVAN
INVENTOR.

BY R. E. Granger
ATTORNEY

United States Patent Office 3,217,706
Patented Nov. 16, 1965

3,217,706
IMPEDANCE OCULOGRAPH
George H. Sullivan, Sherman Oaks, Calif., assignor to Spacelabs, Inc., Van Nuys, Calif., a corporation of California
Filed Oct. 2, 1962, Ser. No. 227,909
7 Claims. (Cl. 128—2.1)

This invention relates to electro-oculography and more particularly to an oculograph for providing an electrical indication of eye position by means of a carrier applied to the orbit and which is amplitude modulated as a result of impedance changes caused by eye movement.

Electro-oculography relates generally to a method of recording voltage changes due to eye movement, from pairs of electrodes attached to the body surface near the eye. The graphic display of the continuously measured changes in trans-orbital potential differences comprises the electro-oculogram (EOG). The EOG provides an indirect measure of the ocular standing potential and may be used to derive a precise, continuous record of eye position and its time derivative, eye motion.

Heretofore, the ocular standing D.-C. potential and its variations have been measured directly by means of high-gain D.-C. amplifier-recorder systems which typically comprised a vacuum-tube voltmeter used as an input to a galvanometer. A straight D.-C. recording system requires the detection of signals ranging in amplitude from 50 microvolts to 3500 microvolts for eye fixation changes between 2.5° to 90°, and which average 35 microvolts per per degree of eye rotation. In order to operate successfully in this signal range, the noise level inherent in these prior art systems must be maintained at one microvolt or less, which is relatively difficult to achieve. Susceptibility to noise, drift, and instability results in serious shortcomings in prior techniques. Furthermore, the inherent drift of prior apparatus has made it difficult to establish long-term calibration standards.

By means of the present invention, a signal is obtained which is in the form of an amplitude-modulated carrier thus permitting the use of an A.-C. amplifier-recorder system with its inherently superior stability. Impedance changes which occur between pairs of periorbital electrodes are employed to modulate the applied carrier, and the demodulated carrier will provide the EOG potential level and its variations. That is, the technique of the present invention utilizes the impedance change, referenced to external electrodes, which occurs across the orbit (eye socket) as the eyes are rotated from a central fixation point (CFP) in the visual perimeter. The modulation signal is linearly proportional to the D.-C. signal of the classic electro-oculogram but is more easily amplified. The present invention overcomes other shortcomings of prior methods and permits registration of eye motion without direct contact with the eye or interference with vision, even in absolute darkness and with the eyes open or closed. Other distinct advantages are that the electrodes do not become polarized, shifts in body potential are overcome, and base line shifts cause less interference with the desired signal.

The oculograph of the present invention finds a unique contemporary application in bioastronautics since it provides a means for obtaining certain biological data indicative of an astronaut's physical condition in flight. Heretofore it has been difficult, if not impossible, to electrically monitor the condition of an astronaut to determine incipient vertigo, motion sickness, or similar conditions resulting from spatial disorientation. It has been found that nystagmus occurs immediately prior to loss of balance or spatial disorientation. By the present invention this condition can be electrically detected and, if desired, be telemetered to the ground, thus indicating the psychological and/or physiological condition of the astronaut with respect to weightlessness, for example.

The apparatus of the invention is also useful in studies of problems involving the precise determination of fixation focus, as in visual search and tracking.

It is, therefore, a principal object of the present invention to provide novel and improved apparatus for detecting and/or measuring eye movement.

Another object of the invention is to provide a novel and improved impedance oculograph for providing an electro-oculogram in response to the impedance change which occurs between a pair of periorbital electrodes as the eye moves.

Still another object of the invention is to provide novel and improved apparatus for electrically indicating eye position and/or detecting nystagmus.

Another object of the invention is the improvement of oculographs generally.

A general object of this invention is to provide novel and improved apparatus for generation of the EOG signals which overcome the disadvantages of previous means and methods heretofore intended to accomplish generally similar purposes.

Other objects of this invention will in part be obvious and will in part appear hereinafter.

Many other advantages, features and additional objects of the present invention will become manifest to those versed in the art upon making reference to the detailed description and the accompanying sheets of drawings in which a preferred structural embodiment incorporating the principles of the invention is shown by way of illustrative example.

FIGURE 1 is a simplified schematic diagram illustrating the polarized eyeball rotating in an orbital volume conductor.

FIGURE 2 illustrates the relative locations in which the pickup electrodes are disposed about the eyes.

FIGURES 3a, 3b and 3c illustrate alternative modes of eye electrode connections.

FIGURE 4 is a simplified block diagram of the apparatus of the present invention.

FIGURE 5 is a typical oculogram obtained by means of the apparatus of the present invention illustrating eye shifts of three magnitudes.

FIGURE 6 is a block diagram useful in explaining the calibrating and operating procedures applicable to the apparatus of the present invention.

Figure 7:
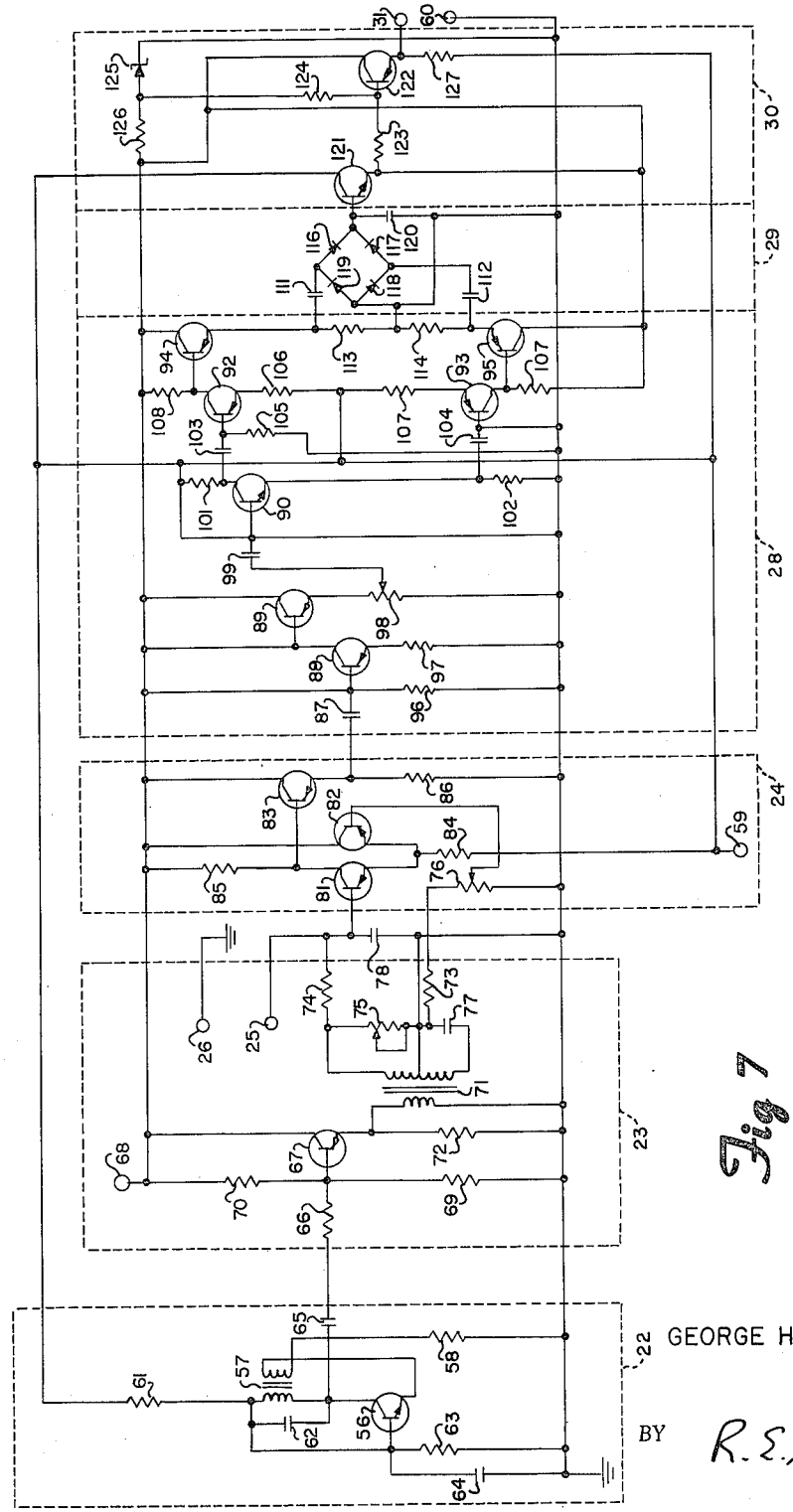
FIGURE 7 is a schematic circuit diagram of the apparatus of FIGURE 4.

The source of the voltage changes recorded from the orbital surface as the eye moves is the steady potential difference across the eyeball. An electrode on the cornea of the eye is as much as six millivolts higher in D.-C. potential than another electrode placed at its back or fundus. The EOG potential is the change in potential difference obtained from the periorbitally placed surface electrodes 6 and 7 when the eye 1 moves away from a precisely designated reference position 5 to another position 8 with respect to the orbit. The EOG potential has, heretofore, been measured by means of a galvanometer 9 or similar instrument. FIGURE 1 is a highly simplified circuit diagram of this arrangement and, in particular, notes the central fixation point 5.

If the electrical behavior of the eyeball in the orbit is approximated by a current dipole rotating in a relatively homogenous volume conductor 2, then the amplitude of an alternating current carrier, applied across electrodes 6 and 7 may be modulated in response to the effective impedance changes which occur with changing orientation of the current dipole.

The applied carrier current normally is selected to have a frequency several times that of the highest frequency of the information that must be accurately measured. This permits simple and effective demodulation for extraction of the information from the carrier.

Looking now at FIGURE 1, the eye 1 may be represented as a current dipole rotating in a relatively homogeneous volume conductor 2. It is electrically positive at the cornea 3 and negative at the fundus 4. The neutral position of the eye, or the point to which the bioelectric vector passes when the eye is at rest, is referred to as the central fixation point (CFP) and is indicated at 5. A standard reference position is obtained by having the subject look directly at a fixation target which remains in a known, constant relation to the head, when the head is in a fixed position. The potential that exists between two periorbital electrodes 6 and 7 when the eye 1 is at this reference position 5 is assumed to be the reference potential. The EOG potential is by definition zero when the eye is in this reference position. Rotation of the cornealfudic axis (vector) away from the CFP, as indicated at 8, introduces a change in electrode potentials which is approximately proportional to the angle of rotation. By repetition of eye movements between fixation targets of known angular separation from a reference fixation point in the horizontal meridian plane at eye level, an isopotential plot may be derived. Eye calibration measurements made between a standard pair of fixation targets provide a measure of the EOG potential level. Calibration techniques will be discussed in greater detail hereinafter.

In a preferred embodiment of the present invention, the electrical optokinetic signal is obtained by means of a plurality of electrodes mounted around the periphery of the orbit.

Binocular EOG recordings are obtained by using four pairs of surface electrodes 11–18 which are disposed around the left 19 and right 20 eyes as shown in FIGURE 2 to measure separately, but simultaneously, the vertical and horizontal eye motion components. Electrode 11 is placed above the supraorbital margin and electrode 12 is placed below the infraorbital ridge; this pair of electrodes provides the left eye vertical component signal. Electrodes 15 and 16 are mesially disposed at the inner and the outer canthus, respectively, of the left eye to provide the horizontal component signal. Similarly, electrodes 13 and 14 provide the right vertical signal and electrodes 17 and 18 provide the right horizontal signal.

If desired, the eye electrodes may be connected in parallel as shown in FIGURE 3a or in series as shown in FIGURE 3b; either way will give an output signal which is the average between the two eyes. If desired, a series connection may be used for the horizontal electrodes and a parallel connection for the vertical electrodes as shown in FIGURE 3c. Application conditions will dictate which of these alternative connections is most suitable.

The direct recording of the D.-C. periorbital potential, as practiced in the prior art, is particularly susceptible to spurious bioelectric signals. For example, electrocardiogram (EKG) and electromyogram (EMG) signals have been superimposed upon the EOG signals. In some instances the EKG signals have been eliminated by low-pass filtering; however, the EMG signals produced by head movements, brow wrinkling, etc., have been difficult to overcome. The apparatus of the present invention, being impedance responsive, is less susceptible to these spurious signals. The frequency of the output EOG signal ranges from D.-C. to 15 cycles per second; therefore, a sharp cut-off filter may be employed to prevent interference by EKG and EMG signals.

Problems encountered with the electrodes employed heretofore arise from their polarization, changes in contact resistance, and electrode mis-match which cause spurious D.-C. signals. A pure silver electrode with a silver welded lead (to avoid a bi-metallic junction) and a contact layer of deposited silver chloride has been found to be satisfactory. Non-polarizable silver silver-chloride or potassium chloride electrodes containing an isotonic conducting medium have also been found to give satisfactory EOG recordings. The electrodes may be of the type shown and disclosed in my United States Patent No. 3,151,619 entitled Electrode for Electromedical Equipment.

Preferably, the skin is cleaned with a mild solvent before applying the electrodes, in accordance with well known practice.

Looking now at FIGURE 4 there is shown a block diagram of the electronic circuits for generating the carrier signal and the demodulator-amplifier circuits responsive to the electrode signals. For clarity only a single channel is shown, this being the horizontal component of a single eye. This channel comprises six major circuit blocks, it being understood that duplication of certain circuit blocks would be necessary for obtaining a vertical component signal. The first block comprises an oscillator 22 for generating the carrier. In a typical construction the carrier frequency may be 40 kilocycles per second. The carrier output is supplied through a buffer amplifier 23 to a differential amplifier 24. The electrodes 25 and 26 applied to the orbit of eye 27 are connected to the differential amplifier and to a band-pass amplifier 28.

The electrodes are impressed with the 40 kc. carrier applied to differential amplifier 24. The eye 27 comprises a series impedance between differential amplifier 24 and the band-pass amplifier 28. The output from the amplifier 28 is applied to a bridge detector 29 which extracts the EOG signal from the modulated carrier. The detector output is amplified via output amplifier 30 and may be supplied to a strip chart recorder 32, telemeter, or other utilization device via output terminal 31. Circuit details will be described more fully hereinafter in connection with the discussion of FIGURE 7.

In a binocular EOG system, a single oscillator (e.g. 40 kc. oscillator 22) may provide a carrier, via separate ones of a plurality of buffer amplifiers, to all four pairs of electrodes. Other portions of the system would, of course, also have to be duplicated beyond the buffer amplifiers.

Alternate left-right and right-left eye motions, in a horizontal plane at eye level, are indicated by the binocular EOG recording (electro-oculogram) shown in FIGURE 5. In this instance the binocular EOG recordings are taken from the four pairs of separate electrodes as shown in FIGURE 2, and are measured separately, but simultaneously. Amplitude is indicated along the ordinate 33 and time is indicated along the abscissa 34. The uppermost trace in FIGURE 5 comprises the left-eye vertical component signal. The left-eye horizontal (LH) trace is directly below the left-vertical (LV) trace, and is followed by the right-eye horizontal (RH) and right-eye vertical (RV) traces. The first fixation, indicated by the interval I, indicates fixation shifts starting from neutral or the CPF 35 and thereafter alternating between 10 degrees right 36 and 10 degrees left 37. The fixation shifts during interval II indicate shifts from 20 degrees right to 20 degrees left. The fixation shifts indicated during interval III correspond to fixation shifts from 30 degrees right to 30 degrees left. As can be seen, only a negligible vertical output signal occurs during the horizontal shifts of the eye at eye level.

When characteristic patterns of cornealfundic impedance differences and variations have been established, they can be used as correlates of the complex phenomena they reflect, and be controlled during the assessment of a group norm, as in the study of individual differences and variations due to age, and during continuous measurement of eye position.

Calibration and/or the plotting of isopotential maps to find the loci of fixations may be obtained by detecting and recording horizontal and vertical eye movements while the eye is focused on a moving target having a known trajectory pattern. Such a system is schematically shown in FIGURE 6 in which the target is in the form of a spot of light displayed on the screen of a cathode ray oscilloscope 40. The use of only vertical electrodes is generally preferred in this test because the vertical signal, with its associated eye blink interference, is more difficult to measure than its horizontal counterpart, and is therefore a more valid test. The impedance oculograph 41 is attached to a pair of vertical electrodes 42 and 43 via lines 44 and 45 and its output is supplied to one channel of strip chart recorder 46 via line 47. The system detects and records vertical eye movements when the eye 48 is focused on a moving target on screen 40. In a practical configuration, the screen 40 may be 5 inches in diameter and the subject 49 may be placed 15 centimeters distant, as measured between the eye 48 and the CFP 50. A target position selector 51 is used to control the loci of the target spot. For example, selector 51 may supply various dicrete deflection voltages to the oscilloscope via line 52 to direct the target spot to selected points along the vertical axis of the oscilloscope screen. In the example shown, any one of ten discrete positions may be selected. The discrete steps may be spaced one centimeter apart above and below the midpoint of the screen 40. The midpoint of the screen corresponds to CFP 50 and is the reference position when the eye 48 of the test subject 49 is focused directly ahead along axis 53. The target spot location on the screen is a function of the sign and the amplitude of the deflection voltage supplied to the oscilloscope, and is supplied via line 54 as an input to the second channel of the strip chart recorder 46; thus, the deflection voltage will provide a trace corresponding to the actual position of the target.

With the target spot positioned to a point one centimeter above the CFP the eye must move upward through an angle of 3°49′, measured from the midline plane 50 of the eye 48 in order to track the target. This angle is indicated as $\phi_1$, in FIGURE 6. In order to observe a target four centimeters above the CFP, the eye must move upward from the CFP to an angle of 18°25′ as indicated by $\phi_5$. Intermediate loci of the eye and corresponding target positions are indicated by $\phi_2$–$\phi_4$ in FIGURE 6. Actual tests indicate a very high degree of correlation between the two inputs, 47 and 54, to the strip chart recorder 46 in response to visual tracking of various target positions selected by position selector 51. As can be seen, the system does not directly monitor the direct current generated by the eye as do prior systems.

Looking now at FIGURE 7 there is shown a schematic circuit diagram of the apparatus of FIGURE 4. The portion of the circuit enclosed within the dotted outline identified as 22 corresponds to oscillator 22 of FIGURE 4 and comprises a 40 kilocycle sine-wave oscillator. Transistor 56 has its emitter circuit regeneratively coupled to its base circuit via transformer 57. The primary winding of transformer 57 is connected between ground (via resistor 58) and the emitter of transistor 56. The transformer secondary winding is connected to the positive voltage supply terminal 59 via resistor 61. The secondary winding of transformer 57 is shunted by capacitor 62 and provides the drive signal to the base of transistor 56. The base of transistor 56 is referenced to ground terminal 60 via resistor 63 and capacitor 64. The output of the oscillator 22 is supplied to buffer amplifier 23 via coupling capacitor 65.

The buffer amplifier 23 comprises transistor 67 which is connected in an emitter-follower arrangement with the collector of transistor 67 connected to the negative power supply terminal 68. The base is referenced to ground via resistor 69 and bias voltage is provided by resistor 70. The primary winding of transformer 71 is connected to the emitter circuit of transistor 67 and is also referenced to ground via resistor 72. The secondary of transformer 71 comprises a center tapped winding which is used to power an impedance bridge comprising resistors 73–76, capacitors 77–78 and the external impedance appearing across terminals 25 and 26.

The terminals 25 and 26 are connected to the periorbital electrodes so that the impedance of the eye becomes a part of one arm of the impedance bridge circuit. The network consisting of capacitor 77, resistor 73, and variable resistor 76 is connected to one half of the secondary winding of transformer 71 and comprises one half of the impedance bridge. The second half of the impedance bridge comprises resistors 74–75, the remaining half of the transformer 71 secondary, and the external impedance applied between terminals 25–26.

Each half of the impedance bridge is connected to corresponding ones of the two inputs of a differential amplifier. The carrier is impressed across both networks comprising the impedance bridge and the amplitude of the carrier output from the relatively-fixed impedance network is adjusted by variable resistor 76. Variations in the amplitude of the carrier output from the other network result from changes in the external impedance (appearing across terminals 25–26) and comprise the input intelligence. The carrier signals in the two networks are normally 180° out of phase. Minor phase balancing adjustments may be made by means of variable resistor 75.

The differential amplifier comprises transistors 81–83. Capacitor 78 serves to smooth the input to transistor 81 and thereby eliminate spurious transients outside the range of interest. The emitters of input transistors 81 and 82 are referenced to the positive supply terminal 59 via resistor 84. Bias voltages are supplied via resistors 85 and 86. Since the input signal to the base of transistor 81 is normally 180° out of phase with respect to the input signal supplied to transistor 82, the output from transistor 83 will be zero when the amplitudes of the two input signals are equal. Changes in the external impedance connected across terminals 25 and 26 will change the relative amplitudes of the two carrier signals and will thereby result in an output voltage appearing at the emitter of transistor 83.

The output of transistor 83 is supplied via coupling capacitor 87 to the input stage of amplifier 28. Amplifier 28 comprises a band-pass amplifier which amplifies the 40 kc. output of differential amplifier 24; it comprises two cascaded voltage amplifier stages, a phase splitter, and a push-pull output. Transistor 90 comprises a phase splitter to provide an out-of-phase input to the push-pull amplifier comprising transistors 92–95. Operating voltages are supplied to transistor 88 via resistors 96–97. The gain of the input amplifier stages is adjusted by variable resistance 98. The input to phase splitter 90 is via coupling capacitor 99. The collector of transistor 90 is referenced to the positive supply 59 via resistor 101 and is referenced to ground 60 via resistor 102. The two outputs from the phase splitter 90 are supplied to transistors 92 and 93 via coupling capacitors 103 and 104, respectively. The base of transistor 92 is referenced to ground via resistor 105 and bias voltages are supplied to the emitters of transistors 92 and 93 via resistors 106 and 107, respectively. Bias resistors 108 and 109 are connected to the collectors of 92 and 93, respectively. The output of transistors 94 and 95 are supplied to demodulator 29 which comprises a full-wave bridge rectifier.

The input to the bridge detector or demodulator is supplied via coupling capacitors 111 and 112. The emitters of transistors 94 and 95 are referenced to ground via resistors 113 and 114, respectively. The bridge detector comprises diodes 116–119. The detector output is smoothed by capacitor 120 and applied to output amplifier 30, which comprises cascaded transistors 121 and 122. The output of transistor 121 is directly coupled to transistor 122 via resistor 123. The base of transistor 122 is connected to a reference voltage supply via resistor 124.

The reference voltage supply comprises zener diode 125 and resistor 126, which are connected between ground 60 and the negative supply terminal 68. The emitter of transistor 122 is connected to the positive supply terminal 59 via resistor 127. The amplifier output is available at terminal 31 and may be used as an input to a strip chart recorder or other display device. The reference voltage supply applied to the output stage 122 will cause the output signal appearing at terminal 31, to be referenced to zero in the absence of an input signal, rather than being referenced to the negative D.-C. voltage supply.

It should be understood that the circuit of FIGURE 7 comprises only a single input channel and that two such channels would be required if fixations in all directions, of a single eye, are to be precisely measured. Four channels would be required for binocular measurements.

As will be apparent to those versed in the art, oscillator 22 may be common to a plurality of channels, isolation being provided by a plurality of buffer amplifiers of the type indicated at 23.

Inasmuch as each of the functional units represented by a block in the block diagram of FIGURE 4 may be any one of numerous equivalent devices for each respective function well known in the art, the invention should not be construed as being limited to the preferred circuits shown in FIGURE 7. There being a range of general circuit equivalents, it is considered that the present invention embraces a method aspect, in which the impedance change, rather than the direct measurement of the bioelectric potential of the eye, is measured.

Since certain changes may be made in the above method, devices, and system apparatus without departing from the scope of the invention herein involved, it is intended that all matter contained in the above description or shown in the accompanying drawings shall be interpreted as illustrative and not in a limiting sense. Therefore, it being understood that various omissions and substitutions and changes in the form and details of the apparatus illustrated and in its operation may be made by those skilled in the art, without departing from the spirit of the invention, it is intended that the invention be limited only as indicated by the scope of the following claims.

What is claimed is:

1. An impedance oculograph comprising:
    a pair of electrodes adapted to be spaced apart about the periphery of the orbit,
    means for supplying an alternating current carrier freqency of fixed amplitude to said electrodes,
    detector means responsive to variations in the amplitude of said carrier frequency caused by changes in impedance between said electrodes, and
    indicator means connected to said detector means for displaying the magnitude of said impedance change.

2. An impedance oculograph as defined in claim 1 wherein said carrier supplying means comprises:
    an oscillator, and
    a buffer amplifier;
    and said detector means comprises:
    differential amplifier means, and
    a bridge detector circuit connected to the output of said differential amplifier means.

3. An impedance oculograph comprising:
    first and second pairs of electrodes adapted to be applied to the body surface near the eye, one electrode of said first pair of electrodes being applied above the eye and the other electrode of said first pair being applied below the eye; one electrode of said second pair being applied in the region of the inner canthus and the other electrode of said second pair being applied in the region of the outer canthus,
    oscillator means for supplying a fixed amplitude carrier voltage to said first and second pairs of electrodes,
    first demodulator means connected to said first pair of electrodes for providing an electrical output signal corresponding to the vertical position of the eye with respect to a neutral position, and
    second demodulator means connected to said second pair of electrodes for providing an electrical output signal corresponding to the horizontal position of the eye with respect to said neutral position.

4. An impedance oculograph as defined in claim 3 wherein said first and second demodulator means each comprise:
    an impedance bridge having a corresponding one of said pairs of electrodes connected in one arm thereof, and said oscillator means being connected to the input thereof,
    amplifier means connected to the output of said impedance bridge, and
    a bridge detector connected to the output of said amplifier means.

5. An impedance oculograph as defined in claim 3 including:
    a pair of reference supplies connected to corresponding said ones of demodulator means whereby said electrical output signals will be zero when said eye is centered between said pairs of electrodes.

6. The method of electrically measuring the position of the eye relative to a reference position comprising the steps of:
    applying a fixed amplitude alternating current carrier between two spaced apart points on the periphery of the orbit whereby said eye presents an impedance load to said carrier,
    measuring the impedance presented to said carrier between said points, and
    comparing said measured impedance with a reference impedance to provide an electrical difference output signal, the sign and amplitude of which corresponds to the relative position of said eye with respect to said reference position.

7. The method of generating an oculogram comprising the steps of:
    impressing a fixed-frequency alternating current carrier signal, from a constant amplitude source, across the orbit,
    demodulating the carrier signal appearing across said orbit to provide an electrical signal corresponding to the impedance presented to said source, and
    recording the magnitude of said signal.

References Cited by the Examiner

UNITED STATES PATENTS

| | | | |
|---|---|---|---|
| 2,799,269 | 7/1957 | Mathison | 128—2.1 |
| 2,829,638 | 4/1958 | Douglas | 128—2.1 |
| 3,085,566 | 4/1963 | Tolles | 128—2.1 |

OTHER REFERENCES

Arden: The Lancet, June 2, 1962, pages 1164–1165.

RICHARD A. GAUDET, *Primary Examiner.*